(12) United States Patent
Werner

(10) Patent No.: US 7,657,899 B2
(45) Date of Patent: Feb. 2, 2010

(54) DYNAMIC CREATION OF PROXY SOFTWARE OBJECTS AT TIME OF EXECUTION

(75) Inventor: Kevin W. Werner, Colorado Springs, CO (US)

(73) Assignee: Computer Associates Think, Inc., Islandia, NY (US)

( * ) Notice: Subject to any disclaimer, the term of this patent is extended or adjusted under 35 U.S.C. 154(b) by 933 days.

(21) Appl. No.: 11/076,407

(22) Filed: Mar. 9, 2005

(65) Prior Publication Data

US 2006/0206905 A1 Sep. 14, 2006

(51) Int. Cl.
*G06F 3/00* (2006.01)
*G06F 9/44* (2006.01)
*G06F 9/46* (2006.01)

(52) U.S. Cl. ................. 719/330; 719/313; 719/332; 717/108; 717/162; 717/165; 717/168

(58) Field of Classification Search ................. 719/310, 719/313, 330, 332; 717/100, 108, 162, 165, 717/168
See application file for complete search history.

(56) References Cited

U.S. PATENT DOCUMENTS

2004/0172639 A1 9/2004 Luo et al.

OTHER PUBLICATIONS

International Preliminary Report on Patentability from corresponding Application Serial No. PCT/US2006/008451, mailed Sep. 20, 2007 (8 pages).
Eugster, Patrick T., "Dynamic Proxies for Classes: Towards Type-Safe and Decoupled Remote Object Interaction," EPFL Technical Report 200317, XP-002398981, 2003, (18 pages).
Welch, I. et al., "Dalang-A Reflective Extension of JAVA," Technical Report CS-TR-672, XP-002398982, Sep. 1999, (24 pages).
Notification of Transmittal of the International Search Report and the Written Opinion of the International Searching Authority for corresponding patent application No. PCT/US2006008451, mailed Sep. 28, 2006, (12 pages).

*Primary Examiner*—Hyung S Sough
*Assistant Examiner*—Qing-Yuan Wu
(74) *Attorney, Agent, or Firm*—Shumaker & Sieffert, P.A.

(57) ABSTRACT

A technique is described that allows a software client to create at run-time a software object that appears to extend or alter the functionality of an existing software class definition. For example, a decorator factory generates a proxy object that dynamically implements a set of interfaces specified by the software client at runtime. From the perspective of the client, the proxy object is logically a child object of the original existing base object. The child object appears to be enhanced by the methods and attributes defined by the set of interfaces and the methods implemented by the delegate object. However, the proxy object does not have actual parent classes. Instead, an invocation transparently intercepts method invocations from the client to the proxy object and invokes the appropriate method, regardless of whether the method is implemented in the base object, the delegate object, or within the proxy object itself.

25 Claims, 5 Drawing Sheets

INVOCATION HANDLER — 60

| NEW INTERFACES 40 | BASE OBJECT INTERFACE 42 | BASE DECORATOR INTERFACE 46 | SPECIAL METHODS INTERFACE 48 |
|---|---|---|---|
| REFERENCE TO BASE OBJECT 64 | | REFERENCE TO ATTRIBUTE MAP 67 | |
| REFERENCE TO DELEGATE OBJECT 66 | | REFERENCE TO BASE OBJECT METHOD MAP 68 | |
| REFERENCE TO DELEGATE OBJECT METHOD MAP 69 | | | |

FIG. 3

DYNAMIC CREATION OF PROXY SOFTWARE OBJECTS AT TIME OF EXECUTION

TECHNICAL FIELD

The invention relates to computing devices, and more particularly, object-oriented computer software running on computing device hardware.

BACKGROUND

A computer program is a series of instructions given to a computing device to make the device perform specific operations. Because a modern computer program can be very complex, it is often useful to write the program at a high level of abstraction. Object-oriented programming techniques facilitate such high level abstraction by allowing a programmer to conceptualize segments of the program as distinct objects. For instance, an object might contain a collection of attributes and methods. In addition, the object has one or more interfaces. Each interface contains information about how client program segments can interact with the object associated with the interfaces. Client program segments can only change the attributes contained within the object through methods defined by one of interfaces associated with the object. An actual implementation of an object is a class. Viewed from the opposite direction, an object, as actually used in computer software, is an instance of a class.

A child class is a class that contains the functionality of a parent class. In general, the child class has all of the interfaces, methods, and attributes of the parent class. In other words, the child class inherits the interfaces, methods, and attributes of the parent class. However, the child class may contain interfaces, methods, and attributes in addition to those inherited from the parent class. In this way, a child class may be understood as an adapter for the parent class. As described by Gamma, Helm, Johnson, Vlissides, DESIGN PATTERNS, 139, Addison-Wesley (1995), an adapter converts the interface of a class into another interface that clients expect. Furthermore, the child class may implement the methods of the parent object in alternative ways. In the context of the Java™ and C++ programming languages, child classes are referred to as subclasses and parent classes are known as super classes. Child objects and parent objects are instances of child classes and parent classes.

All classes, parent and child, must be defined before the code embodying the classes is compiled. After compilation the class definitions are immutable. Therefore, a client cannot generally define a new class or create instances of such a class at run-time. However, in certain situations, fixed object definitions are not always desirable. For example, it is sometimes necessary at run-time to define a child object that has a new interface, adds a new attribute, or overrides an existing method of an existing object. Gamma, supra, 175, refers to the process of adding responsibilities to an object at run-time when the object is utilized by a client as decoration or wrapping.

Current methods of creating objects that fit with the parent/child class scheme at run-time are often cumbersome and inelegant. Such methods typically force the client to view the objects outside the object-oriented paradigm. For example, a dynamic proxy object technique promulgated by Sun Microsystems Inc. of Santa Clara, Calif. allows the creation of client-defined objects at run-time. However, this technique does not represent the client-defined objects in terms of a parent object/child class relationship. This means that the client software may have to treat the client-defined object differently than an object whose interfaces and method implementations were specified at compile-time. Treating objects differently based on time of creation disrupts the object-oriented programming paradigm, disturbs the logical flow of the programming language code, and may complicate debugging. In addition, conventional dynamic proxy object techniques are often central processing unit (CPU) intensive.

SUMMARY

In general, the invention is directed to techniques for dynamically manipulating the control of software object definitions at execution time. More specifically, a "decoration framework" is described that allows clients to dynamically create proxy objects that provide extension or modification to object interfaces and method implementations. In particular, a client may use a single method to dynamically create a child object of an existing parent object at the time of execution. This new object is referred to herein as a proxy object because the proxy object stands in the place of a real child object whose class was defined at compile-time. The existing parent object is referred to herein as the base object because the base object is the base or foundation upon which the proxy object is built. From the perspective of the client, the proxy object is an instance of a child class that extends the class of the base object with new interfaces, methods, attributes, and alternative method implementations. Using the described framework, the client flexibly changes how the client interacts with its objects at run time. Moreover, these techniques allow the client to create a proxy object that can more easily exhibit multiple inheritance.

After the client creates the proxy object, the client can interact with the object using the same high level programming language code to refer to the proxy object as the client would use to refer to a child object of the base object that had been defined when the high level code was compiled. In other words, after creating the proxy object, the client does not have to treat the proxy object differently than any other object. As described in further detail, the decoration framework supplies an invocation handler. The invocation handler uses the same code to handle all method invocations to any proxy object. When the client initiates a method invocation to a method of a proxy object, the invocation handler transparently intercepts the method invocation and invokes the method of the proxy object corresponding to the method invocation.

In one embodiment, the invention is directed to a method in which a proxy object is created at execution time and an invocation handler is used to transparently handle method invocations directed to the proxy object by the client. The proxy object generated by the first step of this method is defined by a base object, a set of interfaces and a set of method implementations specified by a client.

In another embodiment, the invention is directed to a computing device that comprises a decorator factory, a map to store attribute values and an invocation handler. The decorator factory generates a proxy object that dynamically implements a set of interfaces specified by a client executing on the computing device. The invocation handler processes method invocations directed by the client to the interfaces of the proxy object and invokes the corresponding methods of the proxy objects.

In another embodiment, the invention is directed to a computer-readable medium containing instructions. The instructions cause a programmable processor to create a proxy object defined as an instance of a runtime class definition. The instructions further cause a processor to use an invocation handler to identify a method defined by the class definition of the proxy object when the client initiates a method invocation directed to the instance of the proxy object, and invoke the method defined by the definition of the proxy object that corresponds with the method invocation initiated by the client.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 3 is a block diagram illustrating the internal elements of an exemplary proxy object.

DETAILED DESCRIPTION

Figure 1:
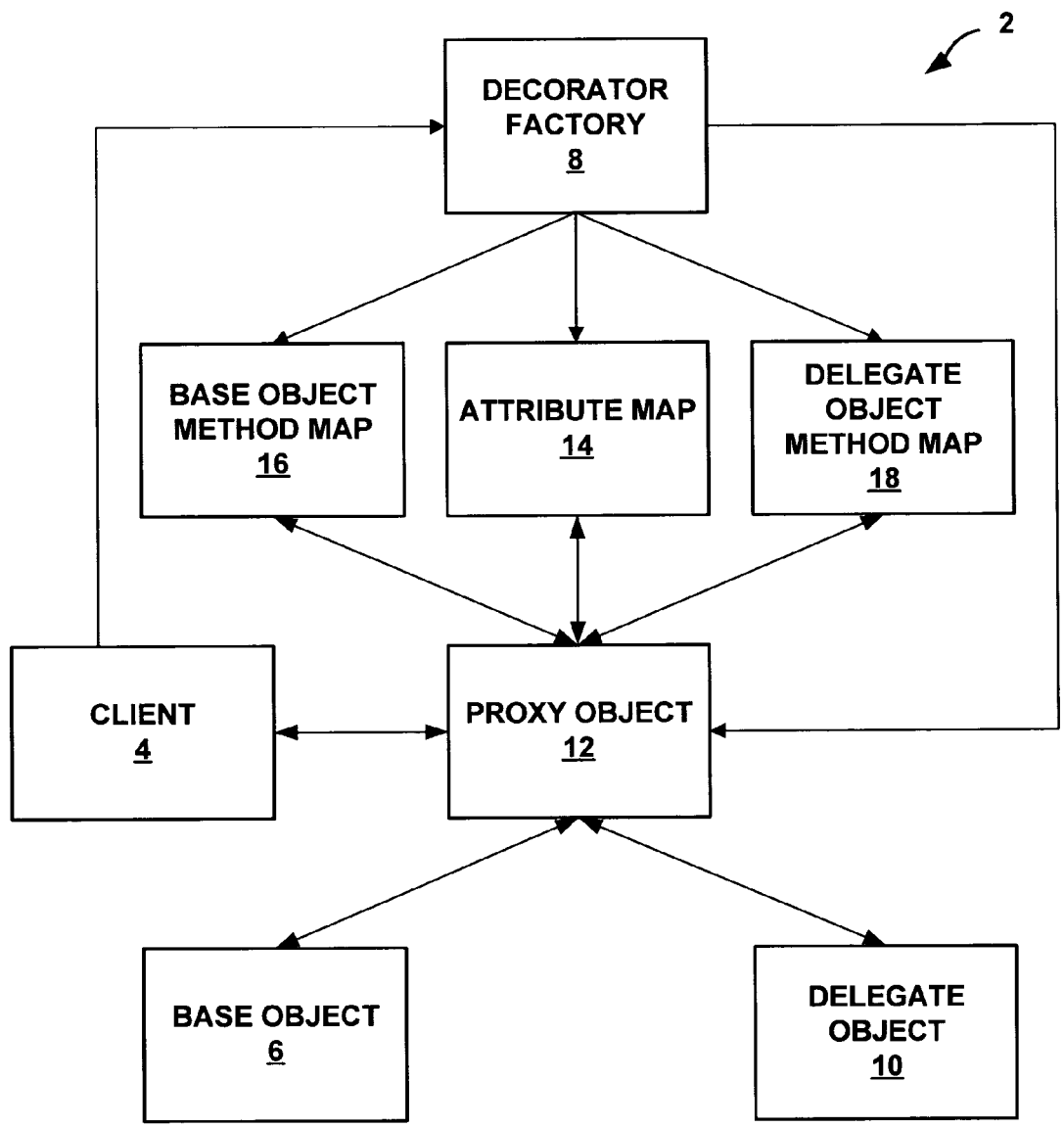
FIG. 1 is a block diagram illustrating an exemplary computer-implemented system that allows dynamic extension and modification to object interfaces.

FIG. 1 is a block diagram illustrating an exemplary computer-implemented object decoration framework 2 that allows dynamic creation of software objects that extend or modify the functionality of a class of a base object in accordance with the principles of the invention. For example, object decoration framework 2 may be used to dynamically create a proxy object 12 that implements a set of interfaces specified by a software client 4 at run-time during execution of the client.

In general, decorator factory 8 is an abstraction mechanism for dynamically creating dynamic proxy objects. For example, client 4 may invoke decorator factory 8 to create a new proxy object 12. From the perspective of client 4, proxy object 12 is an instance of a child class of the class of a base object 6 extended by any additional interfaces, attributes, and method implementations supplied to decorator factory 8 by client 4.

Client 4 supplies method implementations to decorator factory 8 through a delegate object 10. Delegate object 10 is an instance of a delegate class that defines all the data and methods necessary to implement any new or alternative methods of the child class. In other words, the task of performing the work of the methods has been delegated to delegate object 10. The delegate class may extend a delegate base class, which is a class that implements certain methods necessary for the proxy class. In framework 2, if a method with the same name and parameter list is implemented in both delegate object 10 and base object 6, the method implemented in delegate object 10 is executed. In effect, the method implemented in delegate object 10 overrides the method implemented in base object 6. In this manner, framework 2 may be used to manage the flow of control between objects.

Because the methods implemented in delegate object 10 effectively override the methods implemented in base object 6, client 4 is able to dynamically choose the implementation of methods at run-time. Suppose, for example, that base object 6 implements a method that uses a slow but precise algorithm to calculate a floating point number. If, at run-time, client 4 decides that a faster, but less accurate, algorithm is more appropriate, client 4 could utilize decoration framework 2 to create a proxy object that uses the faster algorithm. Specifically, client 4 could direct decorator factory 8 to generate an instance of a proxy class by supplying decorator factory 8 with base object 6 and a delegate object that implements the faster algorithm.

In one embodiment, delegate object 10 includes methods that allow client 4 to reference proxy object 12 and base object 6. In the terms of the Java™ programming language, these methods allow client 4 to treat proxy object 12 as an instance of a subclass of the class of base object 6. Moreover, proxy objects may be used as base objects for additional proxy classes. Thus, decorator framework 2 allows client 4 to dynamically create layers of proxy objects at run-time. Further, regardless of the number of layers defined at run-time, client 4 may interact with the resultant proxy object 12 as if the class of the proxy object had been defined at compile-time.

In addition, decorator factory 8 updates attribute map 14 to store values of attributes associated with proxy object 12. Attribute map 14 relates the names of attributes to their values using a map or any other data structure. For example, when invoking decorator factory 8, client 4 may define pairs of get and set methods in an interface. The methods in a get/set pair retrieve or set the value of a single attribute. If the methods of the get/set pair are not implemented in delegate object 10 or base object 6, decorator factory 8 creates an entry in attribute map 14 for the attribute associated with the get/set pair. When client 4 invokes the get or set methods for this attribute, proxy object 12 uses attribute map 14 to retrieve or set the value of the attribute.

When client 4 needs to use a method defined in proxy object 12, the client initiates a method invocation directed to proxy object 12 via an invocation handler. As described in further detail, the invocation handler handles all method invocations for proxy object 12. When proxy object 12 receives a method invocation, the invocation handler searches through the methods provided by delegate object 10. If delegate object 10 provides the requested method, the invocation handler invokes the method. If client 4 expects a return value in response to the method invocation, proxy object 12 returns the value in a normal fashion. Otherwise, the invocation handler determines whether the requested method is implemented internally by proxy object 12, by the decorated base object 6, or by an attribute specified in attribute map 16. Upon finding the requested method, the invocation handler invokes the correct object and executes the method.

In some embodiments, object decoration framework 2 includes a base object method map 16 and a delegate object method map 18 to aid the invocation of requested methods. Base object method map 16 and the delegate object method map 18 may be implemented as a mapping, hash table, or other type of data structure. The invocation handler of proxy object 12 may use these maps as caches to quickly determine whether base object 6 or delegate object 10 define and implement the method invoked by client 4.

In this manner, proxy object 12 transparently intercepts and processes method invocations from client 4. As a result, client 4 may treat proxy object 12 just like any other software object that implements a list of interfaces. For example, client 4 may use the same code when referring to proxy object 12 as client 4 would use when referring to an object whose interfaces were defined at compile-time. In this way, client 4 uses decoration framework 2 to create objects that wrap, decorate, or adapt other objects dynamically at run-time.

Moreover, client 4 may define multiple proxy objects so as to mimic multiple inheritance. In general, a class with multiple inheritance has multiple direct parent classes. This allows client 4 to combine the functionality of different classes. Using object decorator framework 2 to mimic multiple inheritance may be especially useful for Java™ programmers because the Java™ programming language does not permit this flexibility with it's multiple inheritance mechanism. Object decorator framework 2 allows client 4 to select a method from any class (instead of a single class) for use as an implementation of an interface. Moreover, client 4 may select the class and the interface during run-time.

Figure 2:
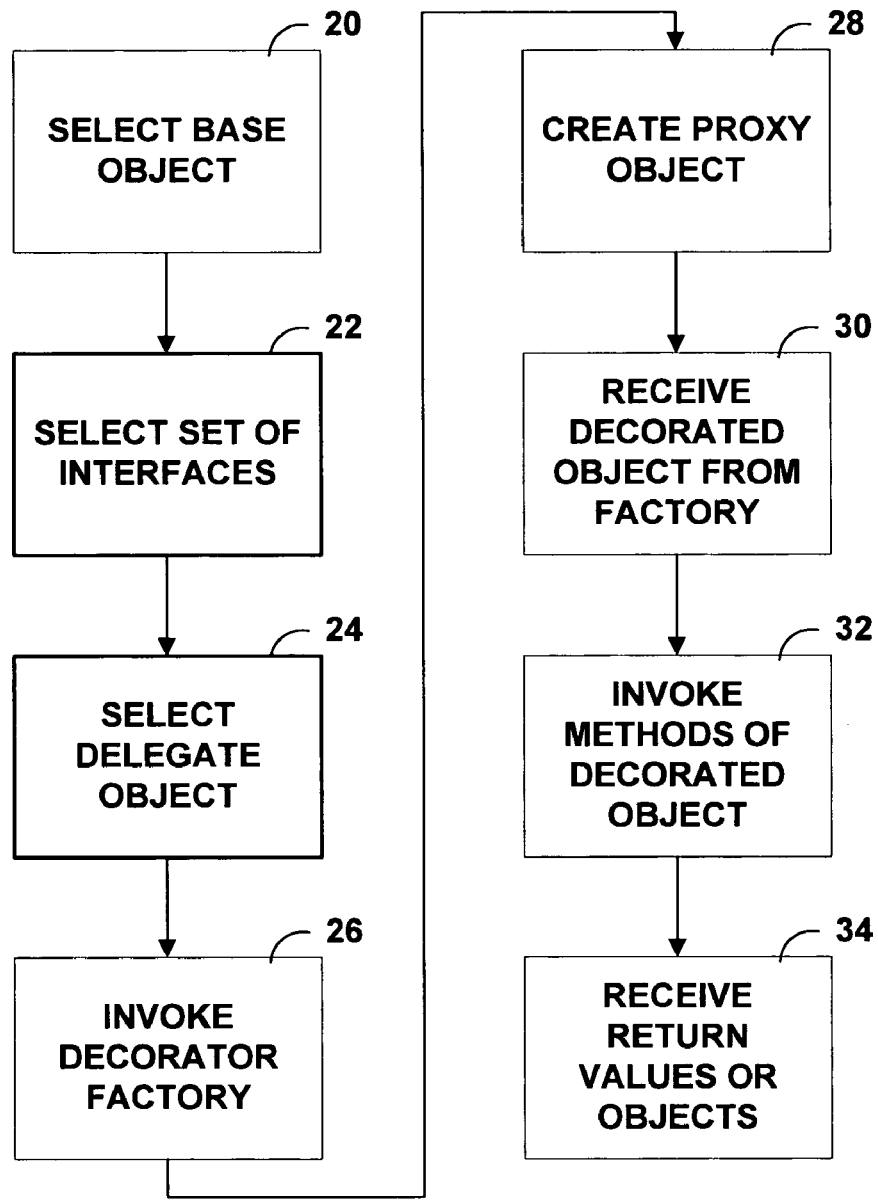
FIG. 2 is a flowchart illustrating a series of steps that could be used by client software to create and utilize a proxy object produced by this invention.

FIG. 2 is a flowchart illustrating exemplary operation of client 4 when creating proxy object 12 and invoking methods provided by the proxy object. Initially, client 4 selects a base object 6 to decorate or wrap (20). Next, client 4 determines a set of interfaces to add to base object 6 (22). The interfaces in the set of interfaces might include definitions of new methods, definitions of get and set methods for new attributes, and other methods to be added or overwritten. Client 4 may, for example, create an array that lists interfaces with which base object 6 is to be decorated. In addition, client 4 may also select a delegate object 10 that implements the methods of the set of interfaces or overrides methods of base object 6 (24).

After client 4 has selected base object 6, the set of interfaces, and delegate object 10, client 4 invokes decorator factory 8 (26). Decorator factory 8 has many methods to create new proxy objects, each taking a different combination of input parameters. For example, client 4 may invoke decorator factory 8 as follows:

DecoratorFactory.decorate(Class[] anInterfaceArray, Object theObjectToDecorate), where anInterfaceArray represents the array of interfaces and theObjectToDecorate represents base object 6 to be decorated. Because this method does not take a delegate object, this method would be most useful when adding attributes to base object 6.

Alternatively, client 4 may invoke decorator factory 8 as follows:

DecoratorFactory.decorate(Class anInterface, BaseDelegate aDelegate, Object theObjectToDecorate), where anInterface represents an interface, aDelegate represents delegate object 10, and theObjectToDecorate represents base object 6 to be decorated. Using this method, client 4 uses decorator factory 8 to create a proxy object that uses delegate object 10 to implement the methods of the interface and to override methods implemented in base object 6. The two methods shown above are exemplary and other methods may be defined within decorator factory 8 to create new proxy objects.

As described in detail below, when invoked, decorator factory 8 creates proxy object 12 and returns the proxy object to client 4 (28). Proxy object 12, as outputted by decorator factory 8, possesses all of the interfaces defined in the set of interfaces specified by client 4. Furthermore, from the perspective of client 4, proxy object 12 uses the implementation supplied by delegate object 10. In addition, proxy object 12 has an attribute corresponding with each get/set method pair defined in the set of interfaces that is not implemented in delegate object 10 or base object 6.

Once client 4 receives proxy object 12 from decorator factory 8 (30), client 4 interacts with proxy object 12 as if the class of the proxy object had been fixed at compile-time. For example, client 4 may invoke the methods of proxy object 12 with ordinary method invocation techniques (32). As described, the invocation handler of proxy object 12 transparently handles invocation of the appropriate methods of the proxy object, base object 6 and delegate object 10. Client 4 need not interact with delegate object 10, base object 8, attribute map 14 or delegate object method map 18. If the methods invoked by client 4 returns values or objects, proxy object 12 returns the values or objects as expected (34).

FIG. 3 is a block diagram illustrating an exemplary implementation of invocation handler 60. In this example, invocation handler 60 contains several interfaces 40-48. First, invocation handler 60 includes the set of new interfaces 40 that decorator factory 8 added to base object 6 at run-time at the request of client 4. The methods of new interfaces 40 may be implemented in delegate object 10. In addition, new interfaces 40 may include interfaces associated with new attributes.

Second, invocation handler 60 optionally includes the interfaces of base object 6. Third, invocation handler 60 optionally has a base decorator interface 46. In one embodiment, base decorator interface 46 defines one method: getDecoratedObject. The getDecoratedObject method returns a reference to base object 6. Client 4 may, for example, use the getDecoratedObject method to retrieve and interact with base object 6 after client 4 creates proxy object 12 to extend the functionality of base object 6.

Fourth, invocation handler 60 optionally has a special methods interface 48 that defines additional functions. In general, special methods interface 48 allows proxy object 12 to behave like an object defined at compile time. For example, in one embodiment, special methods interface 48 defines an "equals" method for comparing object references of proxy objects. Without the overridden equals method provided by special methods interface 48, invocation handler 60 would pass method invocations of the equals method through to base object 6. Defining the equals method in the special methods interface ensures that proxy object 12 returns the correct reference comparison. Invocation handler 60 attempts to match method invocations with methods of special methods interface 48 before attempting to match the method invocation with methods defined in base object 6.

In addition to interfaces 40-48 described above, the illustrated embodiment of invocation handler 60 references to: (1) base object 64; (2) delegate object 66; and (3) attribute map 67. In addition, depending on the embodiment, invocation handler 60 may contain implementations of base decorator interface 46, a reference to base object method map 68 and a reference to delegate object method map 69.

In one embodiment, invocation handler 60 is an implementation of the java.lang.reflect.InvocationHandler interface and only has one method, invoke(Object proxy, Method m, Object[ ] args). The invoke method is responsible intercepting and handling method calls directed to proxy object 12. Because proxy object 12 implements the InvocationHandler interface, proxy object 12 contains an implementation of the invoke method, i.e., invocation handler 60. In this manner, decoration framework 2 uses the same implementation of the invoke method for all proxy objects created by decorator factory 8. Proxy object 12 uses invocation handler 60 to implement all logic for referencing and invoking the described components.

Figure 4:
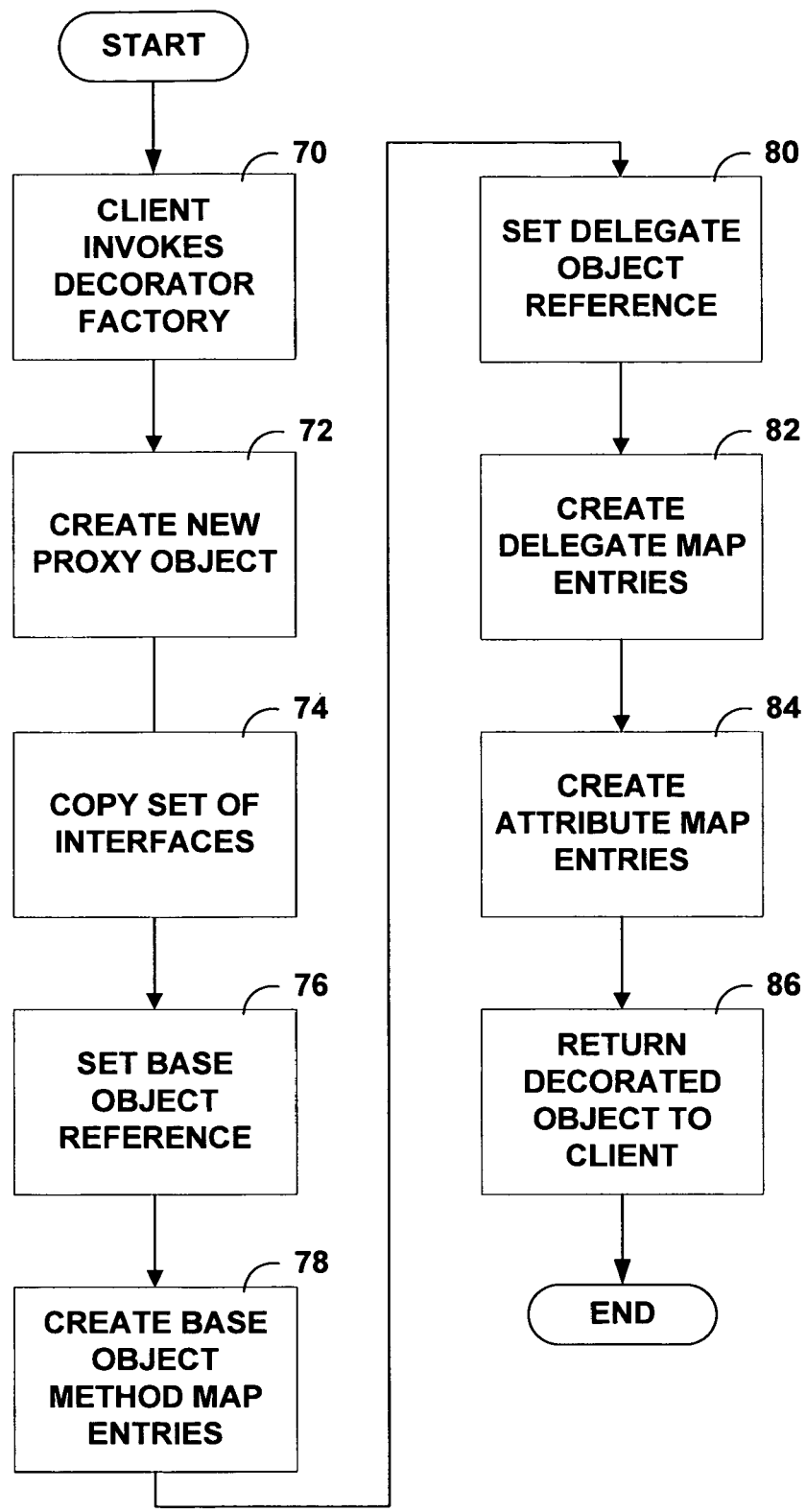
FIG. 4 is a flowchart illustrating an exemplary operation of a decorator factory to create a new proxy object in accordance with the principles of this invention.

FIG. 4 is a flowchart illustrating exemplary operation of decorator factory 8 in further detail. Initially, client 4 invokes decorator factory 8 and requests a new proxy class as described above in reference to FIG. 2 (70). As described, the input parameters for the methods of decorator factory 8 may include a set of interfaces, a delegate object and a base object.

After client 4 invokes decorator factory 8, decorator factory 8 instantiates a new proxy object 12 (72). If client 4 supplies a set of interfaces as one of the input parameters, decorator factory 8 copies the set of interfaces in the parameter into proxy object 12 (74).

Decorator factory 8 next sets base object reference 64 in proxy object 12 to point to the base object received as an input parameter (76). In embodiments using base object method map 16, decorator factory 8 sets base object method map reference 68 to base object method map 16. Decorator factory 8 then scans the methods in the base object specified by the input parameter and creates a new entry in base object method map 16 for each method (78). Base object method map 16 may improve the performance of invocation handler 60 in that invocation handler 60 need not scan the methods of the base object specified by the input parameter each time client 4 invokes one of the methods.

If client 4 includes a delegate object as an input parameter, decorator factory 8 sets delegate object reference 66 in proxy object 12 to the delegate object specified by the input parameter (80). In embodiments using delegate object method map 18, decorator factory 8 sets delegate object method map reference 69 to delegate object method map 18. Decorator factory 8 then scans each method of the delegate object and makes a new entry in delegate object method map 18 for each method (82). As before, invocation handler 60 can use delegate object method map 18 to quickly find the implementation of the method.

In one embodiment, delegate object 10 implements at least the following three methods: setProxy, thisObject, and superObject. The setProxy method allows proxy object 12 to set a reference in delegate object 10 to proxy object 12. The thisObject method returns a reference to proxy object 12. The superObject method returns a reference to base object 6. The method is called superObject because, from the perspective of client 4, base object 6 may be viewed as a member of the parent class of proxy object 12. In this manner, proxy object 12 acts like an instance of a child class whose parent class is the class of base object 6. However, proxy object 12 has no parent class, only a list of interfaces it implements.

Moreover, delegate object 10 may be an instance of a child class of a BaseDelegate class. Instances of the BaseDelegate class act as a generic delegate objects. The BaseDelegate class implements the setProxy, thisObject, and superObject methods. The class of delegate object 10 is defined as an extension of the BaseDelegate class. To ensure type protection, delegate object 10 may also define a getThis and a getSuper method. The getThis method returns a reference to proxy object 12 cast to the type that delegate object 10 expects proxy object 12 to be. The getSuper method returns a reference to base object 6 cast to the type that delegate object 10 expects base object 6 to be. By contrast, in this embodiment, the thisObject and the superObject methods of the BaseDelegate class return objects of type Object. In addition to these methods, delegate object 10 may include implementations of methods of base object 6 that client 4 wants to override and implementations of new methods that client 4 wants to add to base object 6. In this manner, object decoration framework 2 allows client 4 (i.e., an instantiator) to select a base object 6 at run-time and add functionality in one or more layers. Each layer has a new "this" reference that refers to the respective proxy object 12 (i.e., the decorator) and a "super" reference that refers to respective base object 6 (i.e., the decorated object).

If client 4 does not provide a delegate object as an input parameter, decorator factory 8 creates an instance of BaseDelegate and sets delegate object reference 66 to the instance of BaseDelegate. Creating this instance of BaseDelegate allows client 4 to invoke thisObject, superObject, and setProxy on proxy object 12. Including a delegate object in the input parameters is entirely optional and only necessary to override methods of or add functional methods to a base object.

If the input parameters contain one or more get/set method pairs, and such get/set methods are not defined in delegate object, decorator factory 8 adds entries to attribute map 14 (84). Each get/set method pair has a get method and a set method. A get method allows a caller of the get method to retrieve a value or object. A set method allows a caller of set method to set the value or object that is returned by the corresponding get method. For instance, TYPE getFoo( ) and setFoo(TYPE) define a get/set pair for the attribute Foo of data type TYPE. When decorator factory 8 receives such a get/set pair, decorator factory 8 sets attribute map reference 67 to attribute map 14. Next, decorator factory 8 creates a new attribute of type TYPE and puts the new attribute 60 in the proxy object. Decorator factory 8 also creates a name for the new attribute. In the above example, the name of the new attribute might be "Foo". Finally, decorator factory 8 returns proxy object 12 to client 4 (86).

Figure 5:
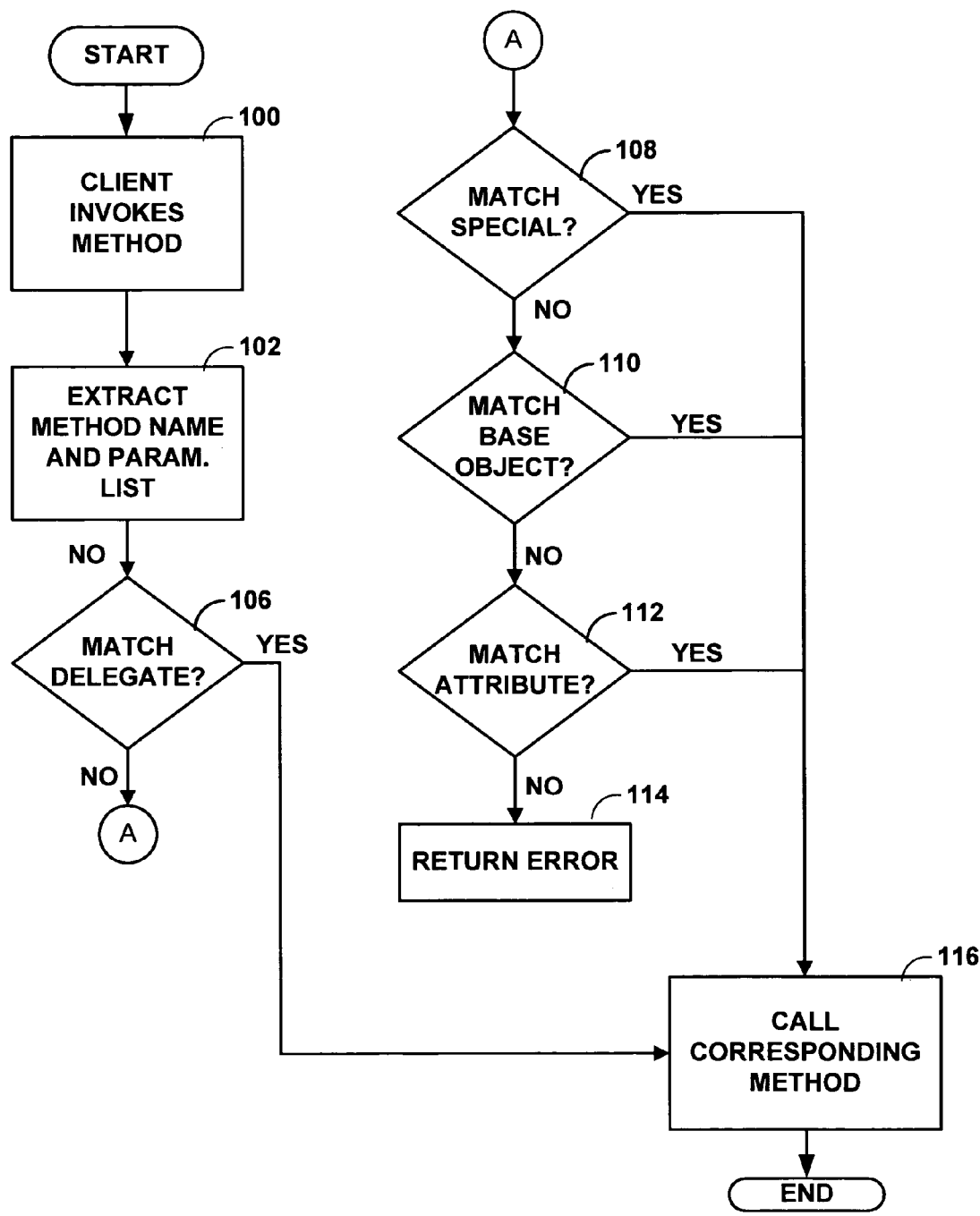
FIG. 5 is a flowchart illustrating an exemplary operation of an invocation handler.

FIG. 5 is a flowchart illustrating an example mode of operation for invocation handler 60. When client 4 makes a method invocation to proxy object 12, invocation handler 60 of proxy object 12 intercepts the method invocation (100).

Invocation handler 60 first extracts a method name and a list of formal parameters from the method invocation (102). The combination of the method name and the list of formal parameters act as a unique method identifier. Once invocation handler 60 has extracted the method identifier, invocation handler 60 performs a sequence of comparisons to determine which method, if any, to invoke.

If the method identifier does not match a method in base decorator interface 46, invocation handler 60 compares the method identifier to methods implemented in delegate object 10 (106). In embodiments using delegate method map 18, invocation handler 60 makes this comparison by checking whether an entry exists in delegate object method map 18 for the method identifier. Because delegate object method map 18 may be implemented as a hash table, determination of whether the method exists may be accelerated. In embodiments without delegate object method map 18, invocation handler 12 searches through the interface list of delegate object 10 until invocation handler 60 either finds a match for the method identifier or there are no methods remaining.

By comparing the method identifier with delegate object 10 before comparing the method identifier with base object 6, invocation handler 60 effectively overrides the implementation provided by base object 6. In other words, if the method identifier corresponds to a method in delegate object 10, invocation handler 60 simply calls that method. Thus, invocation handler 60 never directly invokes the corresponding method implemented in base object 6. Nevertheless, delegate object 10 may call methods of base object 6 because the delegate object can hold a reference to the base object through the superObject( ) method. In this manner, delegate object 10 handles the flow of control and can invoke base object 6 as needed.

In the event delegate object 10 does not implement the requested method, invocation handler 60 compares the method identifier with the methods implemented by special methods interface 48 (108). Similar to the methods of base decorator interface 46, the methods of special methods interface 48 may be implemented within proxy class 12.

If the method identifier does not correspond to a method in special methods interface 48, invocation handler 60 compares the method identifier with the interface of base object 6 (110).

In embodiments using base object method map 16, invocation handler 60 makes this comparison by checking whether an entry exists in base object method map 60 for the method identifier. In the context of the Java™ programming language, a match between the method identifier and a method in the base object is equivalent to invoking a method of a super class that was not overridden.

Finally, invocation handler 60 defaults to attributes methods of new interfaces 44 for storing or retrieving attributes (112). For example, invocation handler 60 may check attribute map 14 to determine whether an attribute corresponding with the method identifier exists. Invocation handler 60 performs this comparison last because delegate object 10 and base object 6 might contain implementations of the get and set methods. If the method identifier does not match a method defined by any interface in proxy object 12, invocation handler 60 returns an error (114).

The following section illustrates an example of adding an attribute to base object 6 using a Java™ programming language embodiment of object decoration framework 2. For example, assume that client 4 is a computer program that monitors and manages a computer network for a small business. The computer network consists of only of workstations for employees of the business. Further assume that each workstation on the network is represented as an object. However, the workstation objects do not include an attribute to identify which employee is associated with the workstation. Using object decoration framework 2, client 4 is able to dynamically add an attribute to each Workstation object to allow client 4 to associate workstations with employees.

The first step of client 4 is to create an interface defining get and set methods for the name of the employee to be associated with the workstation object, as illustrated by the following example code:

```
interface EmployeeNameDecorator {
    String getEmployeeName( );
    void setEmployeeName(String employeeName);
}
```

Next, client 4 invokes decorator factory 8 to add the EmployeeNameDecorator interface to each Workstation object. For the sake of simplicity, it is often easier to perform the decorator factory 8 invocation in a separate helper method.

```
EmployeeNameDecorator decorateWithEmployeeName(Workstation ws) {
    String myEmployeeName = new String("");
    // Invoke the decorator factory
    EmployeeNameDecorator myEmployeeWorkstation =
        DecoratorFactory.decorate(
            EmployeeNameDecorator.class, ws);
    // Set the initial value of the employee name to empty string.
    myEmployeeWorkstation.setEmployeeName(myEmployeeName);
    return myEmployeeWorkstation;
}
```

After invoking the decorateWithEmployeeName method, client 4 has a proxy object that implements both the Workstation interface and the EmployeeNameDecorator interface. In addition, decorator factory 8 has created a new entry in attribute map 14 to store the value of EmployeeName for the proxy object. Assuming that client 4 has a Workstation object called workstationAlpha and the Workstation interface has a method called getIPAddress that retrieves the Internet Protocol (IP) address of the workstation, client 4 could create and interact with the proxy objects as follows:

```
// Use the helper method defined above to create the proxy object.
EmployeeNameDecorator employeeWorkstationAlpha =
    decorateWithEmployeeName(workstationAlpha);
// Set the employee name attribute to "Bob Smith".
employeeWorkstationAlpha.setEmployeeName("Bob Smith");
// Print the IP address of employeeWorkstationAlpha to the screen.
System.out.println((Workstation)employeeWorkstationAlpha.
    getIPAddress( ));
// Retrieve the employee name from employeeWorkstationAlpha.
String name =
    employeeWorkstationAlpha.getEmployeeName( );
```

This example also demonstrates a fundamental principle of object-oriented design: an object is conceptually distinct from the interfaces of the object. To interact with an object the client must specify which interface the client is intending to use. In this example, the employeeWorkstationAlpha object has two interfaces: Workstation and EmployeeNameDecorator. For example, in the Java™ programming language, client 4 specifies the Workstation interface by placing the name of the interface in parentheses in front of the object name. When doing so, client 4 has access to the methods defined by the Workstation interface. In the Java™ programming language, client 4 does not need to specify the EmployeeNameDecorator interface each time client 4 calls a method in the EmployeeNameDecorator interface because client 4 declared employeeWorkstationAlpha as an object of type EmployeeNameDecorator.

The following section illustrates example use of a delegate object to add an additional method and override an existing method. Assume that client 4 monitors and manages a computer network of Workstation objects like the previous example. For simplicity, assume that client 4 did not add the EmployeeNameDecorator interface to the workstation objects. Further, assume that a Workstation object does not have a method to calculate how many seconds the workstation has been online. The Workstation object, however, has a method getTimestamp that returns the second that the workstation came online. Also assume that the Workstation object has a method getTimeStarted that returns a String representing the time when the workstation went online in 24-hour format. Client 4, however, wants getTimeStarted to return a String representing the time when the workstation when online in 12-hour format.

To add the method to calculate the number of seconds since a workstation came online to the workstation objects, client 4 would first define an interface.

```
interface WorkstationTime {
    int secondsOnline( );
}
```

Next, client 4 defines a delegate object class TimeOnlineDelegate that contains an implementation of the secondsOnline method defined in the WorkstationTime interface and an alternate implementation of the getTimeStarted method. In addition, the TimeOnlineDelegate implements the getSuper and getThis methods to ensure type-safety when dealing with the Workstation base object and the proxy object.

```
// The TimeOnlineDelegate extends BaseDelegate in order to inherit
// the setProxy, superObject, and thisObject methods.
class TimeOnlineDelegate extends BaseDelegate {
    Workstation getSuper( ) {
        return (Workstation)superObject( );
    }
    WorkstationTime getThis( ) {
        return (WorkstationTime)thisObject( ) ;
    }
    // Code to implement method added in WorkstationTime interface
    int secondsOnline( ) {
        return (System.currentTimeMillis( ) / 1000) –
            getSuper( ).getTimestamp( );
    }
    // Code overriding the getTimeStarted method of Workstation
    String getTimeStarted( ) {
        String timeIn12HourFormat;
        int timestamp = getSuper( ).getTimeStamp( );
        // CODE FOR PERFORMING TRANSFORMING INTEGER
        TIMESTAMP
        // TO A STRING IN 12-HOUR TIME
        return timein12HourFormat;
    }
} // End of TimeOnlineDelegate class
```

Using the WorkstationTime interface and the TimeOnlineDelegate class, client 4 invokes decorator factory 8 to generate a proxy object. Assuming that client 4 has a Workstation object called workstationBeta, client 4 could generate an object with the WorkstationTime interface and the methods implemented in the TimeOnlineDelegate class with the following code.

```
WorkstationTime wstBeta;
TimeOnlineDelegate myTimeDelegate = new TimeOnlineDelegate( );
wstBeta = DecoratorFactory.decorate(WorkstationTime.class,
myTimeDelegate, workstationBeta);
// Prints the number of seconds since wstBeta came online.
// No need to cast because wstBeta is already type WorkstationTime.
System.out.println( wstBeta.secondsOnline( ) );
// Prints the time wstBeta came online in 12-hour format.
System.out.println( (Workstation)wstBeta.getTimeStarted( ) );
```

Client 4 must specify the Workstation interface for the getTimeStarted method because getTimeStarted is still logically defined in the Workstation interface. This is true in spite of the fact that invocation handler 60 invokes the version of getTimeStarted implemented in the delegate object.

The following section illustrates an example Java™ programming language embodiment of the object decoration framework 2 to mimic multiple inheritance. Once again, assume that client 4 monitors a computer network. However, in this example, the computer network consists of Workstation objects and Printer objects. Both Workstation and Printer objects have a getIPAddress method to return the IP address of the object. Further, assume that at some point during the execution of client 4, client 4 becomes interested only in whether the Workstation and Printer objects on the network were online or offline. In other words, for the purpose of determining online or offline status, client 4 does not care whether the objects represent workstations or printers. Client 4 first defines a new interface called GenericDevice.

```
interface GenericDevice {
    boolean getStatus( );
}
```

Next, client 4 defines a delegate object GenericDeviceDelegate that implements the GenericDevice interface.

```
class GenericDeviceDelegate extends BaseDelegate {
    GenericDevice getThis( ) {
        return (GenericDevice)thisObject( ) ;
    }
    // Cannot cast to particular type because type of
    // parent object not known.
    Object getSuper( ) {
        return superObject( );
    };
    boolean getStatus( ) {
        if (getSuper( ).getName( ) == "Workstation") {
            // If device has IP address, then online.
            if ((Workstation)getSuper( ).getIPAddress( ) != 0) {
                return true;
            } else {
                return false;
            }
        else if (getSuper( ).getName( ) == "Printer") {
            if ((Printer)getSuper( ).getIPAddress( ) != 0) {
                return true;
            } else {
                return false;
            }
        } else {
            // ERROR!
        }
    }
} // End GenericDeviceDelegate class
```

Because the parent object could either be a Workstation or a Printer, the GenericDeviceDelegate does not know ahead of time whether to use the Workstation or the Printer interface to access the getIPAddress method. Therefore, the getStatus method checks the class of the parent object by using the getName( ) method on the parent object to be certain that the parent class defines getIPAddress( ).

After defining the GenericDevice interface and the GenericDeviceDelegate class, client 4 invokes decorator factory 8 using a Workstation object as the base object, GenericDevice as an interface, and GenericDeviceDelegate as delegate to get a proxy object of type GenericDevice. Client 4 then invokes decorator factory 8 in the same way for a Printer object. Assume that client 4 has a Workstation object workstationGamma and a Printer object printerDelta.

```
GenericDevice[2] genericDeviceArray;
GenericDevice genericDeviceGamma, genericDeviceDelta;
GenericDeviceDelegate myDelegateGamma = new
    GenericDeviceDelegate( );
GenericDeviceDelegate myDelegateDelta = new
    GenericDeviceDelegate( );
genericDeviceGamma =
    DecoratorFactory.decorate(GenericDevice.class( ),
    myDelegateGamma, workstationGamma);
genericDeviceDelta =
    DecoratorFactory.decorate(GenericDevice.class( ),
    myDelegateDelta, printerDelta);
genericDeviceArray[0] = genericDeviceGamma;
genericDeviceArray[1] = genericDeviceDelta;
// Print the status of all generic objects to the screen.
for (int i = 0; i < 2; i++) {
    System.out.println(genericDeviceArray[i].getStatus( ));
}
// Use a method specific to the Printer class.
(Printer)genericDeviceArray[1].printDocument("myFile.doc");
// Use a method specific to the Workstation class.
(Workstation)genericDeviceArray[0].saveToDisk("myFile.doc");
// ERROR because the object at position 0 of the array is a
// workstation object.
(Printer)genericDeviceArray[0].printDocument("myFile.doc");
```

After using decorator factory 8 on all Workstation and Printer objects, client 4 is able to treat all devices on the network as objects of type GenericDevice. As shown in the above code, client 4 iterates through an array of GenericDevice objects, using the same method invocation on each object. The code of the loop does not differentiate between GenericDevices that have Workstation base objects and GenericDevices that have Printer base objects.

However, client 4 still has access to the methods of the base objects. In the above code, client 4 uses the object at genericDeviceArray[1] to print a document. This is possible because the logical parent class of the object at genericDeviceArray[1] is Printer and the Printer class defines a printDocument method. Likewise, the object at genericDeviceArray[0] saves a file to disk, a method specific to the Workstation class. In this manner, GenericDevice objects inherit methods from both the Workstation class and the Printer class. In other words, the GenericDevice objects of this example exhibit multiple inheritance.

Various embodiments of the invention have been described. These and other embodiments are within the scope of the following claims.

The invention claimed is:

1. A computer-implemented method comprising:
   providing a class definition as one or more parameters to a decorator factory that dynamically creates a proxy object at run-time during execution of a client, wherein the one or more parameters that define the class comprise a base object that logically represents a parent object of the proxy object, a set of interfaces that defines methods of the proxy object available to the client, and a delegate object that defines a set of method implementations for one or more of the methods defined by the set of interfaces;
   based on the class definition, creating, with the decorator factory, the proxy object as an object that instantiates the class defined by the parameters, wherein the proxy object implements the set of interfaces provided to the decorator factory; and
   using an invocation handler to invoke a method defined by the proxy object in response to a method invocation by the client.

2. The method of claim 1, further comprising invoking the proxy object with the client as though the proxy object is a child object defined during compilation of software.

3. The method of claim 1, wherein creating the proxy object comprises logically defining the proxy object as an instance of a child class of the base object specified by the client during execution of the client.

4. The method of claim 1, wherein the set of interfaces defines methods describing attributes.

5. The method of claim 1, wherein creating the proxy object comprises:
   instantiating the proxy object;
   setting a reference in the proxy object to the base object specified by the client;
   setting a set of interfaces in the proxy object to the set of interfaces specified by the client;
   setting a reference in the proxy object to the delegate object specified by the client; and
   creating references to attributes defined by the set of interfaces specified by the client.

6. The method of claim 1, wherein creating the proxy object comprises:
   generating a base object method map that identifies methods of the base object for the proxy object; and
   generating a delegate object method map that identifies methods of the delegate object for the proxy object.

7. The method of claim 6, further comprising creating the proxy object to implement an interface method for comparing object references of proxy objects.

8. The method of claim 6, further comprising creating the proxy object to implement an interface method for returning a reference to the proxy object and an interface method for returning a reference to the base object from which the proxy object was created.

9. The method of claim 1, wherein creating the proxy object comprises defining a generic method to handle method invocations directed by the client to the proxy object.

10. The method of claim 1, further comprising defining the invocation handler to handle invocation of methods addressed to a plurality of different types of proxy objects.

11. The method of claim 1, wherein using an invocation handler comprises:
    initiating, by the client, a method invocation directed to a method of the proxy object;
    intercepting, by the invocation handler, the method invocation without notifying the client of the interception;
    invoking a method of the proxy object that logically corresponds with the intercepted method invocation; and
    returning a result of the method to the client.

12. The method of claim 11, wherein invoking a method of the proxy object comprises:
    determining whether the method invocation matches methods of a base decorator interface of the proxy object;
    determining whether the method invocation matches methods of the delegate object associated with the proxy object;
    determining whether the method invocation matches methods of a special methods interface of the proxy object;
    determining whether the method invocation matches methods of the base object associated with the proxy object;
    determining whether the method invocation matches methods corresponding to attributes of the proxy object; and
    invoking a method which first matches the method invocation based on the determinations.

13. The method of claim 12,
    wherein determining the match of methods of the delegate object method comprises determining whether an entry corresponding to the method invocation exists in a delegate method map; and
    wherein determining the match of methods of the base object comprises determining whether an entry corresponding to the method invocation exists in a base object method map.

14. The method of claim 1, wherein using the invocation handler permits the client to create a proxy object that mimics multiple inheritance.

15. A computing device comprising:
    one or more processors;
    a decorator factory executing on the one or more processors to dynamically create a proxy object at run-time during execution of a client based on a class definition provided to the decorator factory as one or more parameters, wherein the one or more parameters that define the class comprise a base object that logically represents a parent object of the proxy object, a set of interfaces that defines methods of the proxy object available to the client, and a delegate object that defines a set of method implementations for one or more of the methods defined by the set of interfaces, wherein the proxy object is created as an object that instantiates the class defined by the parameters, and wherein the proxy object implements the set of interfaces provided to the decorator factory; and an invocation handler to invoke a method defined by the proxy object in response to a method invocation by the client.

16. The computing device of claim 15, wherein the proxy object comprises:
   a base decorator interface;
   a set of new interfaces;
   a special methods interface; and
   a base object interface.

17. The computing device of claim 15, wherein the proxy object further comprises:
   a reference to the base object that serves as a logical parent object of the proxy object; and
   a reference to the delegate object that implements additional methods.

18. The computing device of claim 15, wherein the proxy object further comprises an interface method for comparing object references of proxy objects.

19. The computing device of claim 18, wherein the proxy object further comprises an invoke method to perform functions of the invocation handler.

20. The computing device of claim 19, wherein the invocation handler performs a sequence of comparisons to determine the method of the proxy object that logically corresponds with the method invocation.

21. The computing device of claim 20, wherein the sequence of comparisons comprises:
   determining whether the method invocation matches methods of a base decorator interface of the proxy object;
   determining whether the method invocation matches methods of the delegate object associated with the proxy object;
   determining whether the method invocation matches methods of a special methods interface of the proxy object;
   determining whether the method invocation matches methods of the base object associated with the proxy object; and
   determining whether the method invocation matches methods corresponding to attributes of the proxy object.

22. The computing device of claim 15, wherein the proxy object further comprises an interface method for returning a reference to the proxy object and an interface method for returning a reference to the base object from which the proxy object was created.

23. The computing device of claim 15, further comprising:
   a base object method map used by the invocation handler to identify methods of the base object for the proxy object; and
   a delegate object method map used by the invocation handler to identify methods of the delegate object associated with the proxy object.

24. A computer-readable medium comprising instructions for causing a programmable processor to:
   provide a class definition as one or more parameters to a decorator factory that dynamically creates a proxy object at run-time during execution of a client, wherein the one or more parameters that define the class comprise a base object that logically represents a parent object of the proxy object, a set of interfaces that defines methods of the proxy object available to the client, and a delegate object that defines a set of method implementations for one or more of the methods defined by the set of interfaces;
   based on the class definition, create the proxy object as an object that instantiates the class defined by the parameters, wherein the proxy object implements the set of interfaces provided to the decorator factory; and
   use an invocation handler to invoke a method defined by the proxy object in response to a method invocation by the client.

25. The computer-readable medium of claim 24, wherein the instructions cause the processor to:
   determine whether the method invocation matches methods of a base decorator interface of the proxy object;
   determine whether the method invocation matches methods of the delegate object associated with the proxy object;
   determine whether the method invocation matches methods of the base object associated with the proxy object; and
   determine whether the method invocation matches methods corresponding to attributes of the proxy object.

* * * * *

UNITED STATES PATENT AND TRADEMARK OFFICE
CERTIFICATE OF CORRECTION

PATENT NO. : 7,657,899 B2
APPLICATION NO. : 11/076407
DATED : February 2, 2010
INVENTOR(S) : Kevin W. Werner It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1303 days.

Signed and Sealed this

Thirtieth Day of November, 2010

David J. Kappos
*Director of the United States Patent and Trademark Office*